US007990373B2

(12) United States Patent
Xiao et al.

(10) Patent No.: US 7,990,373 B2
(45) Date of Patent: Aug. 2, 2011

(54) POWER SUPPLY CIRCUIT FOR LIQUID CRYSTAL DISPLAY DEVICE AND LIQUID CRYSTAL DISPLAY DEVICE USING THE SAME

(75) Inventors: Hua Xiao, Shenzhen (CN); Tong Zhou, Shenzhen (CN)

(73) Assignees: Innocom Technology (SHENZHEN) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 917 days.

(21) Appl. No.: 11/998,043

(22) Filed: Nov. 27, 2007

(65) Prior Publication Data

US 2008/0122828 A1 May 29, 2008

(30) Foreign Application Priority Data

Nov. 27, 2006 (TW) .............................. 95220885 U

(51) Int. Cl.
*G06F 3/038* (2006.01)

(52) U.S. Cl. ....................................... 345/211; 323/271

(58) Field of Classification Search ............ 345/87–104, 345/204–215; 327/407, 408, 544, 333, 306; 363/74, 41; 323/268, 271, 282; 307/112–144
See application file for complete search history.

(56) References Cited

U.S. PATENT DOCUMENTS

| | | | | |
|---|---|---|---|---|
| 4,848,876 | A * | 7/1989 | Yamakawa | 345/87 |
| 6,288,912 | B1 | 9/2001 | Bedouet | |
| 6,373,479 | B1 * | 4/2002 | Moon | 345/211 |
| 7,760,522 | B2 * | 7/2010 | Nobiki et al. | 363/25 |
| 2008/0030154 | A1 * | 2/2008 | Huang et al. | 318/280 |

* cited by examiner

*Primary Examiner* — Alexander Eisen
*Assistant Examiner* — Patrick Marinelli
(74) *Attorney, Agent, or Firm* — Wei Te Chung

(57) ABSTRACT

An exemplary power supply circuit (200) for a liquid crystal display device (2) includes a switch control circuit (28) for receiving a control signal from an external control circuit, the control signal controlling the turning on or turning off of the switch control circuit; a first DC/DC converter (27) for adjusting the direct current voltage from an external circuit, outputting an output voltage. The switch control circuit controls switches the power supply of the output voltage to a liquid crystal display panel (20) of the liquid crystal display device.

15 Claims, 3 Drawing Sheets

POWER SUPPLY CIRCUIT FOR LIQUID CRYSTAL DISPLAY DEVICE AND LIQUID CRYSTAL DISPLAY DEVICE USING THE SAME

FIELD OF THE INVENTION

The present invention relates to power supply circuits used in liquid crystal display (LCD) devices; and particularly to a power supply circuit having small electrical energy consumption.

BACKGROUND

LCD devices are commonly used as displays for compact electronic apparatuses. This is because they not only provide good quality images with little power consumption, but also they are very thin. A typical LCD device includes a power supply circuit, which supplies operating voltages for various kinds of working units in the LCD device.

Referring to FIG. 3, a conventional power supply circuit 100 for an LCD device (not labeled) includes a low drop-out linear regulator 110, four filter capacitors 121, 122, 123, 124, and a dividing circuit 130. The low drop-out linear regulator 110 transfers an input voltage Vin from an external circuit to a adjustable or a fixed output voltage Vout, and provides the output voltage Vout to a rear direct current/direct current (DC/DC) converter. The dividing circuit 130 is used to adjust and determine the output voltage from the low drop-out linear regulator 110. The first filter capacitor 121 and the second filter capacitor 122 are parallel connected between the input voltage and ground, for low-pass filtering or high-pass filtering the input voltage Vin. The third filter capacitor 123 and the fourth filter capacitor 124 are parallel connected between the output voltage and ground, for low-pass filtering or high-pass filtering the output voltage Vout.

The dividing circuit 130 has a first resistor 131, a second resistor 132, a shunt capacitor 134 and a dividing node 135. The first and the second resistors 131, 132 are connected in series to ground, defining a series branch. The diving node 135 is disposed between the first and the second resistors 131, 132. The shunt capacitor 134 is connected between the diving node 135 and ground, which can prevent the low drop-out linear regulator 110 from increasing a voltage amplification of the output voltage Vout, and inhibit the voltage ripple of the output voltage Vout.

The low drop-out linear regulator 110 includes a voltage input terminal 112, a voltage output terminal 113, and a voltage adjust terminal 114. The input voltage Vin is transmitted to the voltage input terminal 112 after being filtered by the first and the second filter capacitors 121, 122. The voltage output terminal 113 is connected to one end of the series branch of the dividing circuit 130, and the output voltage Vout is supplied to the rear DC/DC converter after being filtered by the third and the fourth filter capacitors 123, 124. The voltage adjust terminal 114 is connected to the dividing node 135, and defines a feedback loop with the dividing circuit 130. The feedback loop provides a reference voltage Vref to the low drop-out linear regulator 110 and adjust the output voltage Vout thereof. The reference voltage Vref is 1.25V voltage difference between the output terminal 113 and the voltage adjust terminal 114 of the low drop-out linear regulator 110, which is defined by the internal circuits of the low drop-out linear regulator 110.

In operation, the input voltage Vin is provided to the low drop-out linear regulator 110 through the voltage input terminal 112, and is modulation transferred to an idea output voltage Vout transmitting out through the output terminal 113. The output voltage Vout is adjusted through the feedback loop of the voltage adjust terminal 114 and the dividing circuit 130, which substantially equals to $Vout=Vref(1+R1/R2)$, wherein R1 is the resistance value of the first resistor 131, and R2 is the resistance value of the second resistor 132. Thus, the adjustment of the output voltage Vout can be realized through the adjusting of the resistance values of the first and the second resistor 131, 132.

However, when the liquid crystal display (LCD) device operates in a stand-by mode, the DC/DC converter 100 keeps supplying output voltage Vout to the rear DC/DC converter of the power supply circuit of the LCD device. Thus, a large quantity of electric energy loss is produced, which makes the power supply circuit have a overlarge power dissipation.

What is needed, therefore, is a power supply circuit that can overcome the above-described deficiencies.

SUMMARY

An exemplary power supply circuit for a liquid crystal display device includes a switch control circuit for receiving a control signal from an external control circuit, the control signal controlling the turning on or turning off of the switch control circuit; a first DC/DC converter for adjusting the direct current voltage from an external circuit, outputting an output voltage. The switch control circuit controls switches the power supply of the output voltage to a liquid crystal display panel of the liquid crystal display device.

Other novel features and advantages will become more apparent from the following detailed description when taken in conjunction with the accompanying drawings.

BRIEF DESCRIPTION OF THE DRAWINGS

The emphasis in the drawings is placed upon clearly illustrating the principles of various embodiments of the present invention. Like reference numerals designate corresponding parts throughout various drawings.

DETAILED DESCRIPTION OF PREFERRED EMBODIMENTS

Reference will now be made to the drawings to describe preferred embodiments of the present invention in detail.

Figure 1:
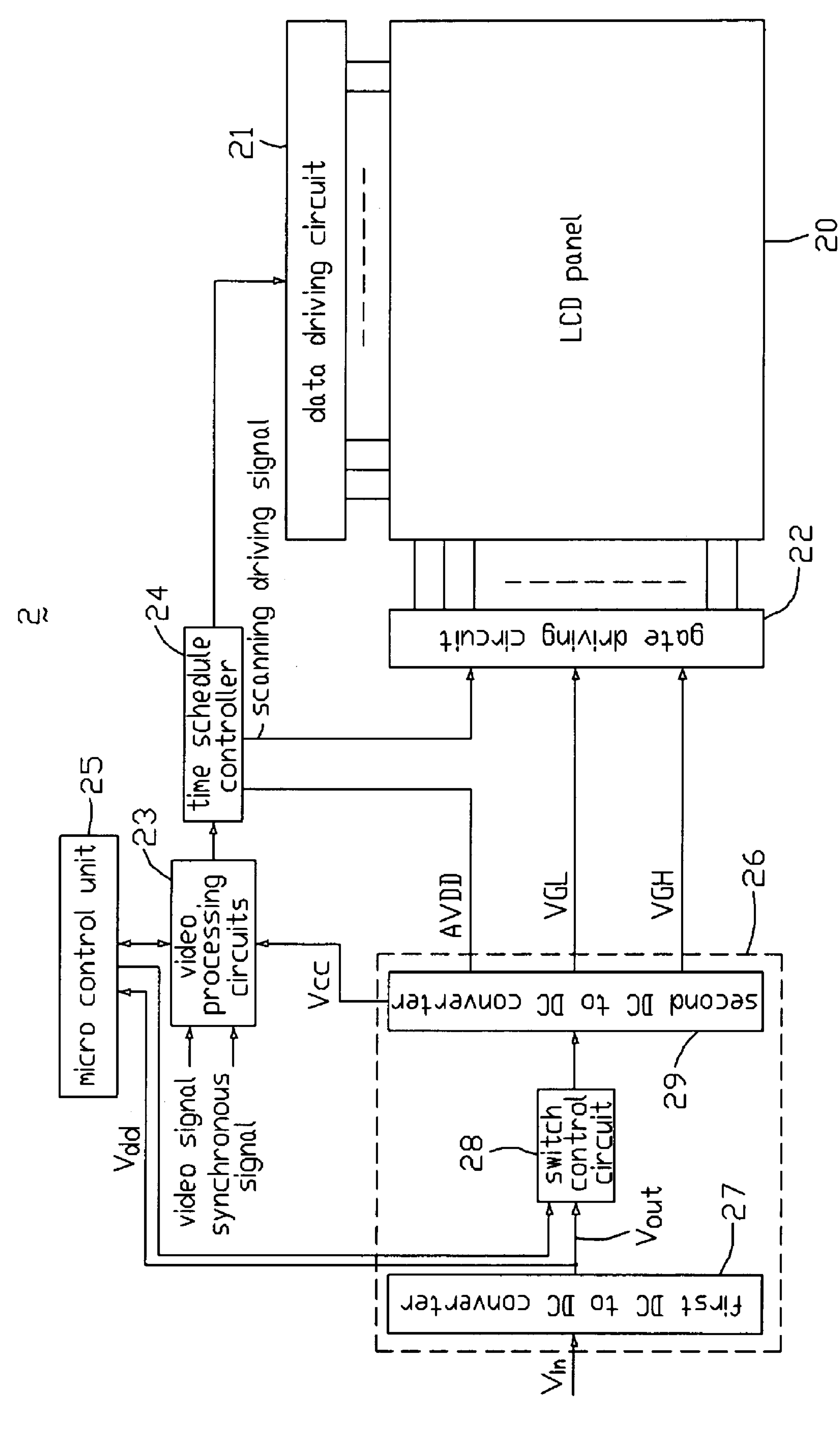
FIG. 1 is a block diagram of a circuit configuration of a liquid crystal display device according to a first embodiment of the present invention, which has a DC/DC converter and a switch control circuit.
Figure 2:
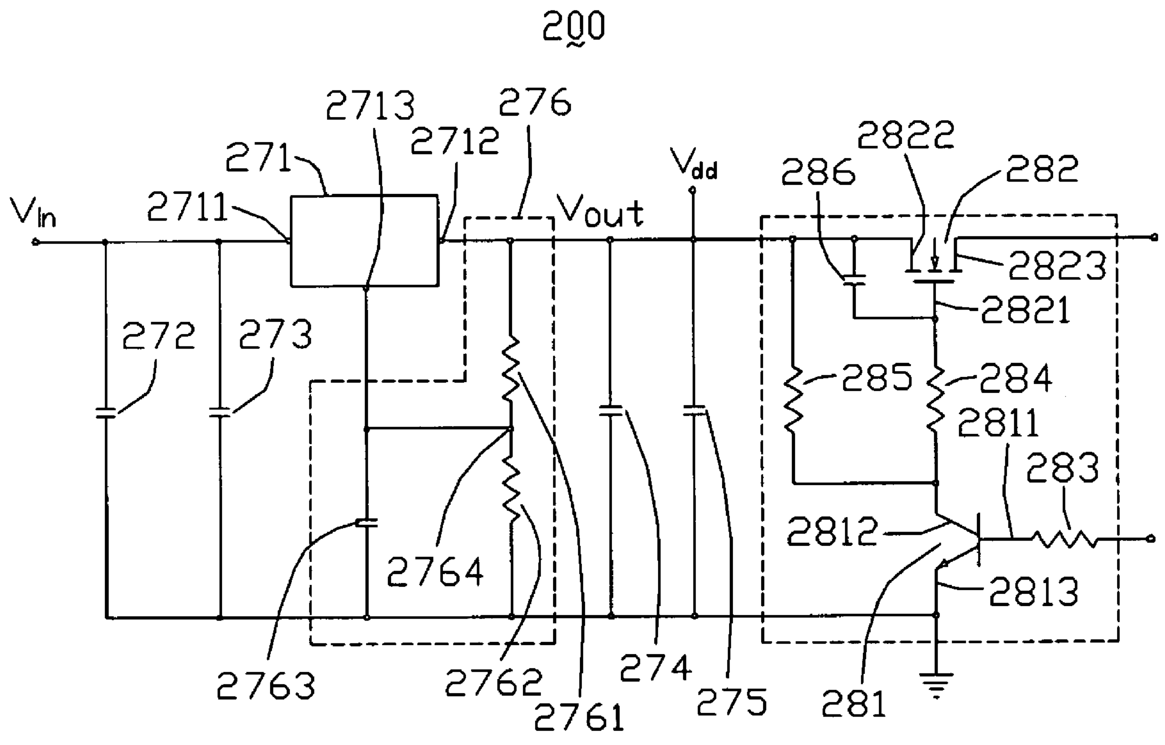
FIG. 2 is a circuit diagram of the DC/DC converter and the switch control circuit.

Referring to FIG. 1, a liquid crystal display (LCD) device 2 according to a first embodiment of the present invention is shown. The LCD device 2 has an LCD panel 20, a data driving circuit 21, a gate driving circuit 22, a video processing circuit 23, a time schedule controller 24, a micro control unit 25, and a power supply circuit 26. The data driving circuit 21 and the gate driving circuit 22 are used to drive the LCD panel 20. The power supply circuit 26 provides working voltages to the internal circuits thereof. The micro unit 25 sends a control signal to the video processing circuit 23, according to a control instruction from a human-computer interaction interface. The video processing circuit 23 processes a video signal and a synchronous signal from an external circuit to output an video data signal maintaining the control instructions to the time schedule controller 24. At the same time, the video processing circuit 23 sends a feedback signal to the micro control unit 25 to tell the finish of the corresponding actions. The time schedule controller 24 transmits the video data signals to the data driving circuit 21 according to the time schedule, and sends a scanning driving signal to the gate driving circuit 22.

The power supply circuit 26 has a first DC/DC converter 27, a switch control circuit 28 and a second DC/DC converter 29. The first DC/DC converter 27 adjust an input voltage Vin from an external circuit, an provides a working voltage Vdd to the micro control unit 25, and outputs an adjusted output voltage Vout to the second DC/DC converter 29 through the switch control circuit 28. The second DC/DC converter 29 transfers the output voltage to gate working voltages VGH, VGL to the gate driving circuit 22, main working voltage of the time schedule controller 24, and working voltage of the video processing circuits 23. The switch control circuit 28 receives the control signal from the micro control unit 25, the control signal controlling turn-on state or turn-off state of the switch control circuit 28.

Figure 3:
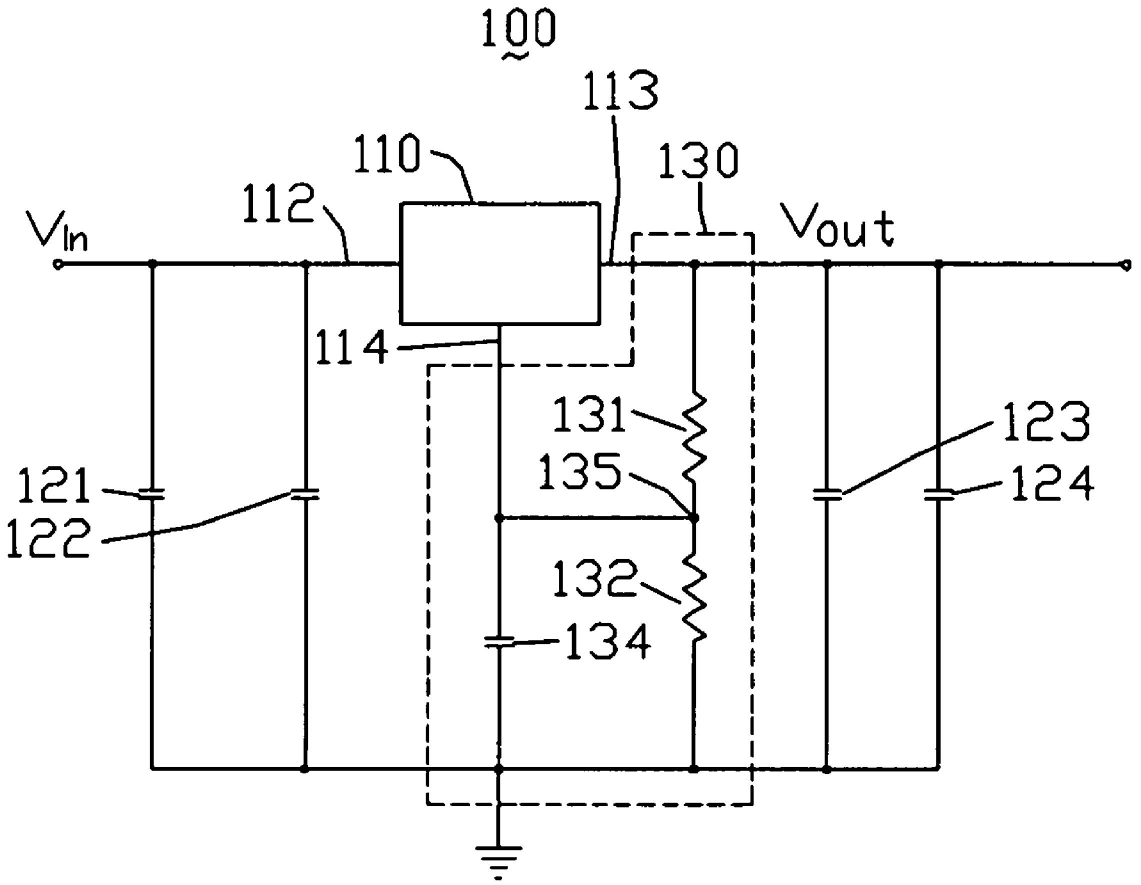
FIG. 3 (RELATED ART)
FIG. 3 is a block diagram of a conventional DC/DC converter of a power supply circuit for an LCD device.

Referring to FIG. 3, the power supply circuit 27 includes a low drop-out linear regulator 271, four filter capacitors 272, 273, 274, 275, and a dividing circuit 276. The low drop-out linear regulator 271 transfers an input voltage Vin from an external circuit to a adjustable or a fixed output voltage Vout, and provides the output voltage Vout to a rear direct current/direct current (DC/DC) converter. The dividing circuit 276 is used to adjust and determine the output voltage from the low drop-out linear regulator 271. The first filter capacitor 272 and the second filter capacitor 273 are parallel connected between the input voltage and ground, for low-pass filtering or high-pass filtering the input voltage Vin. The third filter capacitor 274 and the fourth filter capacitor 275 are parallel connected between the output voltage and ground, for low-pass filtering or high-pass filtering the output voltage Vout.

The dividing circuit 276 has a first resistor 2761, a second resistor 2762, a shunt capacitor 2763 and a dividing node 2764. The first and the second resistors 2761, 2762 are connected in series to ground, defining a series branch. The dividing node 2764 is disposed between the first and the second resistors 2761, 2762. The shunt capacitor 2763 is connected between the diving node 2764 and ground, which can prevent the low drop-out linear regulator 2761 from increasing a voltage amplification of the output voltage Vout, and inhibit the voltage ripple of the output voltage Vout.

The low drop-out linear regulator 271 includes a voltage input terminal 2711, a voltage output terminal 2712, and a voltage adjust terminal 2713. The input voltage Vin is transmitted to the voltage input terminal 2711 after being filtered by the first and the second filter capacitors 272, 273. The voltage output terminal 2712 is connected to one end of the series branch of the dividing circuit 276, and the output voltage Vout is supplied to the micro control unit 25 and the second DC/DC converter 29, respectively, after being filtered by the third and the fourth filter capacitors 274, 275. The voltage adjust terminal 2713 is connected to the dividing node 2764, and defines a feedback loop with the dividing circuit 276. The feedback loop provides a reference voltage Vref to the low drop-out linear regulator 271 and adjust the output voltage Vout thereof. The reference voltage Vref is 1.25V voltage difference between the output terminal 2712 and the voltage adjust terminal 2713 of the low drop-out linear regulator 271, which is defined by the internal circuits of the low drop-out linear regulator 271.

The switch control circuit 28 includes a transistor 281, a field effect transistor (FET) 282, three bias resistors 283, 284, 285, and a postponed starting capacitor 286. The transistor 281 is a NPN transistor, which has a base electrode 2811, a collector electrode 2812, and an emitting electrode 2813. The FET 282 is a P-channel metallic oxide semiconductor field effect transistor (MOSFET), which has a gate electrode 2821, a source electrode 2822, and a drain electrode 2823. The base electrode 2811 of the transistor 281 receives the control signal from the micro-control unit 25 through the first bias resistor 283, the emitting electrode 2813 is grounded, and the collector electrode 2812 is connected to the gate electrode 2821 of the FET 282 through the second bias resistor 284. The source electrode 2822 of the EFT is connected to the voltage output terminal 2712, the drain electrode 2823 output voltage to the second DC/DC converter 29. The third bias resistor 285 is connected between the collector electrode 2812 and the voltage terminal 2712, and the postponed starting capacitor 286 is connected between the gate electrode 2821 and the voltage output terminal 2712.

In operation, the input voltage Vin is provided to the low drop-out linear regulator 271 through the voltage input terminal 2711, and is modulation transferred to an idea output voltage Vout transmitting out through the output terminal 2712. The output voltage Vout is adjusted through the feedback loop of the voltage adjust terminal 2713 and the dividing circuit 276, which substantially equals to Vout=Vref(1+R1/R2), wherein R1 is the resistance value of the first resistor 2761, and R2 is the resistance value of the second resistor 2762. Thus, the adjustment of the output voltage Vout can be realized through the adjusting of the resistance values of the first and the second resistor 2761, 2762. After that, one part of the output voltage Vout is provided to the micro control circuit 25. Because the micro control circuit 25 needs a micro load current, generally less than 50 mA, the electrical energy consumption of the output voltage Vout is less. The other part of the output voltage Vout is provided to the second DC/DC converter 29 through the switch control circuit 28. When the LCD device 2 works normally, the micro control unit 25 sends a high-level control signal to the base electrode 2811 of the transistor 281 and turn on the transistor 281. Thus, the potential of the collector electrode 2812 is nearly equal to zero, and the potential of the gate electrode 2821 of the EFT 282 is lowered to a low-level, and the EFT 282 is turned on, and the output voltage Vout is transmitted to the second DC/DC converter 29 through the drain electrode 2823. On the other hand, when a user inputs a stand-by signal to the micro control unit 25 through the human-computer interaction interface, the control unit 25 sends a low-level control signal to the base electrode 2811 of the transistor 281 and turn off the transistor 281. Thus, the potential of the gate electrode 2821 of the EFT 282 substantially equals to the output voltage Vout, and the EFT 282 is turned off, and the output voltage Vout is just provided to the micro control unit 25.

Comparing to the conventional circuit, the power supply circuit 26 utilizes the switch control circuit 28 to control the transmitting path of the output voltage Vout from the first DC/DC converter 27. Thus, when the LCD device 2 works in a stand-by state, the first DC/DC converter 27 stops supplying output voltage Vout to the second DC/DC converter 29, and only provides it to the micro control unit 25. Because the micro control unit 25 needs a micro load current, generally less than 50 mA, the electrical energy consumption of the output voltage Vout is less. Therefore, the LCD device 2 having the power supply circuit 26 has a small electrical energy consumption when it works at electrical-saving mode.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A power supply circuit for a liquid crystal display device, comprising:

a switch control circuit for receiving a control signal from an external control circuit, the control signal controlling the turning on or turning off of the switch control circuit;

a first DC/DC converter for adjusting a direct current voltage from an external circuit, and outputting an output voltage to the switch control circuit and the external control circuit; and a second DC/DC converter for receiving the output voltage via the switch control circuit and transferring the output voltage to working voltages of the liquid crystal display device;

wherein the switch control circuit comprises a P-channel field effect transistor, a first resistor, a second resistor, a third resistor, a capacitor, and a NPN transistor;

wherein a source electrode of the P-channel field effect transistor is connected to the first DC/DC converter for receiving the output voltage, a drain electrode of the P-channel field effect transistor is connected to the second DC/DC converter for providing the output voltage to the second DC/DC converter, a gate electrode of the P-channel field effect transistor is connected to a collector electrode of the NPN transistor via the second resistor, a base electrode of the NPN transistor is configured for receiving the control signal via the first resistor, an emitter electrode of the NPN transistor is grounded, the third resistor is connected between the source electrode of the P-channel field effect transistor and the collector electrode of the NPN transistor, and the capacitor is connected between the source electrode and the gate electrode of the P-channel field effect transistor;

wherein, when the NPN transistor is turned on under the control of the control signal, the P-channel field effect transistor is turned on such that the output voltage is provided to the second DC/DC converter via the P-channel field effect transistor; and when the NPN transistor is turned off under the control of the control signal, the output voltage output by the first DC/DC converter is provided to the gate electrode of the P-channel field effect transistor via the third resistor and the second resistor to turn off the P-channel field effect transistor so as to prevent the output voltage from being provided to the second DC/DC converter.

2. The power supply circuit as claimed in claim 1, wherein the first DC/DC converter comprises a low drop-out linear regulator that transfers the direct current voltage from the external circuit to the output voltage.

3. The power supply circuit as claimed in claim 2, wherein the first DC/DC converter further comprises a dividing circuit, which is between the low drop-out linear regulator and the switch control circuit, for adjusting the output voltage.

4. The power supply circuit as claimed in claim 3, wherein the dividing circuit is a series dividing resistor branch, and has a node between two adjacent resistors in series.

5. The power supply circuit as claimed in claim 4, wherein the low drop-out linear regulator includes a voltage input terminal, a voltage output terminal, and a voltage adjust terminal, the voltage input terminal receiving the direct current voltage from the external circuit, the voltage output terminal being connected to the dividing circuit and outputting the output voltage, the voltage adjust terminal being connected to the dividing node, and defines a feedback loop with the dividing circuit.

6. The power supply circuit as claimed in claim 1, wherein the P-channel field effect transistor is a P-channel metallic oxide semiconductor field effect transistor.

7. The power supply circuit as claimed in claim 1, wherein the external control circuit is a micro control unit.

8. A liquid crystal display device, comprising:

a liquid crystal panel;

a micro control unit; and a power supply for providing working voltages to the liquid crystal panel, which comprises:

a switch control circuit for receiving a control signal from the micro control unit, the control signal controlling the turning on or turning off of the switch control circuit;

a first DC/DC converter for adjusting a direct current voltage from an external circuit, and outputting an output voltage to the switch control circuit and the micro control unit; and a second DC/DC converter for receiving the output voltage via the switch control circuit and transferring the output voltage to working voltages of the liquid crystal display device;

wherein the switch control circuit comprises a P-channel field effect transistor, a first resistor, a second resistor, a third resistor, a capacitor, and a NPN transistor;

wherein a source electrode of the P-channel field effect transistor is connected to the first DC/DC converter for receiving the output voltage, a drain electrode of the P-channel field effect transistor is connected to the second DC/DC converter for providing the output voltage to the second DC/DC converter, a gate electrode of the P-channel field effect transistor is connected to a collector electrode of the NPN transistor via the second resistor, a base electrode of the NPN transistor is configured for receiving the control signal via the first resistor, an emitter electrode of the NPN transistor is grounded, the third resistor is connected between the source electrode of the P-channel field effect transistor and the collector electrode of the NPN transistor, and the capacitor is connected between the source electrode and the gate electrode of the P-channel field effect transistor;

wherein, when the NPN transistor is turned on under the control of the control signal, the P-channel field effect transistor is turned on such that the output voltage is provided to the second DC/DC converter via the P-channel field effect transistor; and when the NPN transistor is turned off under the control of the control signal, the output voltage output by the first DC/DC converter is provided to the gate electrode of the P-channel field effect transistor via the third resistor and the second resistor to turn off the P-channel field effect transistor so as to prevent the output voltage from being provided to the second DC/DC converter.

9. The liquid crystal display device as claimed in claim 8, wherein the first DC/DC converter comprises a low drop-out linear regulator, which transfers the direct current voltage from the external circuit to the output voltage.

10. The liquid crystal display device as claimed in claim 9, wherein the first DC/DC converter further comprises a dividing circuit, which is between the low drop-out linear regulator and the switch control circuit, for adjusting the output voltage.

11. The liquid crystal display device as claimed in claim 10, wherein the dividing circuit is a series dividing resistor branch, and has a node between two adjacent resistors in series.

12. The liquid crystal display device as claimed in claim 11, wherein the low drop-out linear regulator includes a voltage input terminal, a voltage output terminal, and a voltage adjust terminal, the voltage input terminal receiving the direct current voltage from the external circuit, the voltage output terminal being connected to the dividing circuit and outputting the output voltage, the voltage adjust terminal being connected to the dividing node, and defines a feedback loop with the dividing circuit.

13. A liquid crystal display device, comprising:

a micro control unit configured for providing a control signal; and a power supply circuit comprising a first DC/DC converter, a switch control circuit, and a second DC/DC converter, the first DC/DC converter configured for outputting an output voltage to the micro control unit and providing the output voltage to the second DC/DC converter via the switch control circuit;

the switch control circuit comprising a P-channel field effect transistor, a first resistor, a second resistor, a third resistor, a capacitor, and a NPN transistor;

wherein a source electrode of the P-channel field effect transistor is connected to the first DC/DC converter for receiving the output voltage, a drain electrode of the P-channel field effect transistor is connected to the second DC/DC converter for providing the output voltage to the second DC/DC converter, a gate electrode of the P-channel field effect transistor is connected to a collector electrode of the NPN transistor via the second resistor, a base electrode of the NPN transistor is configured for receiving the control signal via the first resistor, an emitter electrode of the NPN transistor is grounded, the third resistor is connected between the source electrode of the P-channel field effect transistor and the collector electrode of the NPN transistor, and the capacitor is connected between the source electrode and the gate electrode of the P-channel field effect transistor;

wherein, when the NPN transistor is turned on under the control of the control signal, the P-channel field effect transistor is turned on such that the output voltage is provided to the second DC/DC converter via the P-channel field effect transistor; and when the NPN transistor is turned off under the control of the control signal, the output voltage output by the first DC/DC converter is provided to the gate electrode of the P-channel field effect transistor via the third resistor and the second resistor to turn off the P-channel field effect transistor so as to prevent the output voltage from being provided to the second DC/DC converter.

14. The liquid crystal display device as claimed in claim 13, wherein the second DC/DC converter is configured for transferring the output voltage to working voltages of the liquid crystal display device.

15. The liquid crystal display device as claimed in claim 14, further comprising a data driving circuit, a gate driving circuit, a video processing circuit, a time schedule controller, and a liquid crystal panel, the data driving circuit, the gate driving circuit, the video processing circuit, and the time schedule controller configured for receiving the working voltages.

* * * * *